April 12, 1960  W. C. BROEKHUYSEN  2,932,391
CIGARETTE ROD DENSITY MEASURING APPARATUS
Filed Aug. 2, 1951  3 Sheets-Sheet 1

INVENTOR
WILLIAM C. BROEKHUYSEN
BY
ATTORNEY

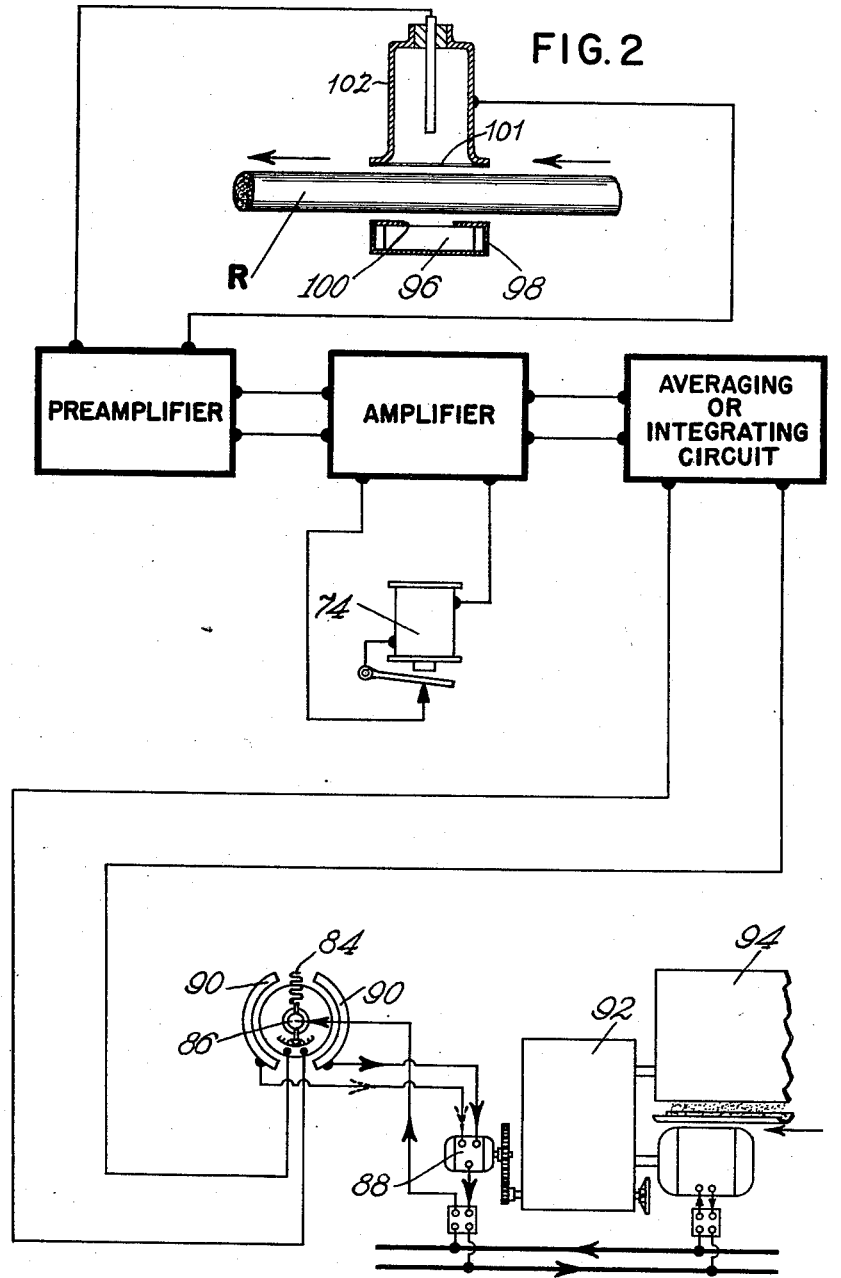

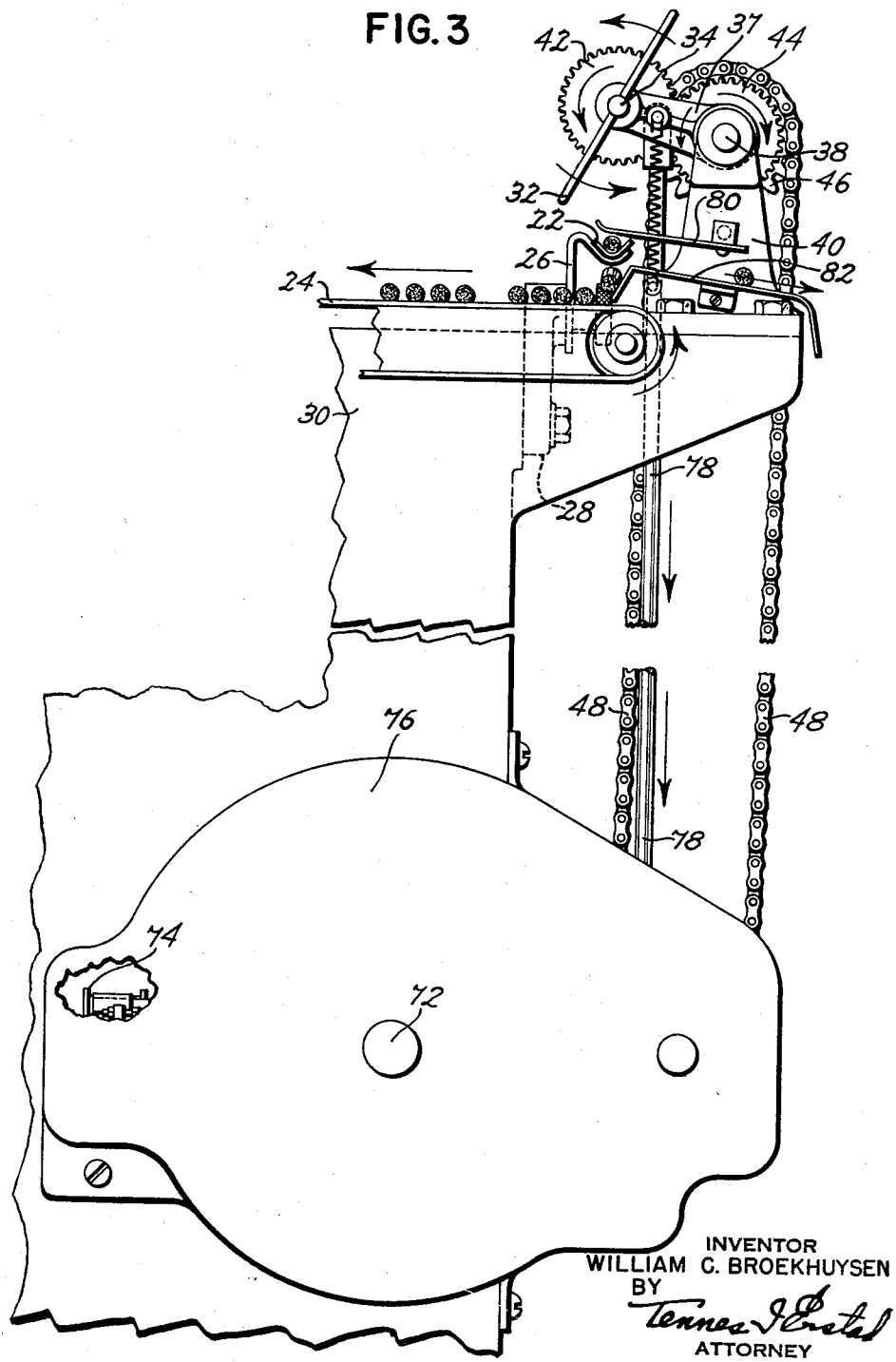

United States Patent Office 2,932,391
Patented Apr. 12, 1960

2,932,391

CIGARETTE ROD DENSITY MEASURING APPARATUS

William C. Broekhuysen, Brooklyn, N.Y., assignor to American Machine & Foundry Company, a corporation of New Jersey Application August 2, 1951, Serial No. 239,975

3 Claims. (Cl. 209—72)

This invention relates to cigarette making machinery and particularly to apparatus for measuring the mass or density of a continuously moving stream of tobacco. More particularly, this invention relates to the measurement of the density of a continuous stream of tobacco by means of radiation and for correcting the operation of a cigarette making machine so as to obtain cigarettes having fillers of a high degree of uniformity and for removing cigarettes produced by the machine which do not come up to predetermined standards.

Heretofore various devices have been designed to measure the condition of cigarettes as they are being manufactured by a cigarette making machine. Such devices have had various disadvantages. For example, they have been insufficiently accurate to correctly measure the density of the rod because they were affected by variations in moisture content and by variations in the type of leaf processed, and the cost of such devices has sometimes been rather high. In other cases, the mechanism itself has been of very intricate design and therefore more subject to the possibility of breakdown.

An object of this invention is to employ radiation such as emanates from radioactive isotopes for the purpose of measuring the density of a cigarette rod.

Another object of this invention is to employ a type of radiation which will avoid all hazards to machine operators from radiation and high voltage.

Another object of this invention is to employ radioactive material such as the isotope of strontium known as strontium 90 giving off beta rays for measuring the density of a moving cigarette rod.

A further object is to provide a method for checking the density of a cigarette rod by passing it through a beam of radiation of known cross section and intensity and then measuring variations in the absorption of the rays by the rod.

Other objects and features of the invention will appear as the description of the particular physical embodiment selected to illustrate the invention progresses. In the accompanying drawings, which form a part of this specification, like characters of reference have been applied to corresponding parts throughout the several views which make up the drawings.

Figure 2 is a diagrammatic illustration of the control mechanism for operating the defective cigarette ejecting apparatus and the feed control mechanism of a cigarette making machine.

Figure 3 is a partial end elevation of the cigarette machine illustrating suitable mechanism for rejecting cigarettes.

Figure 1:
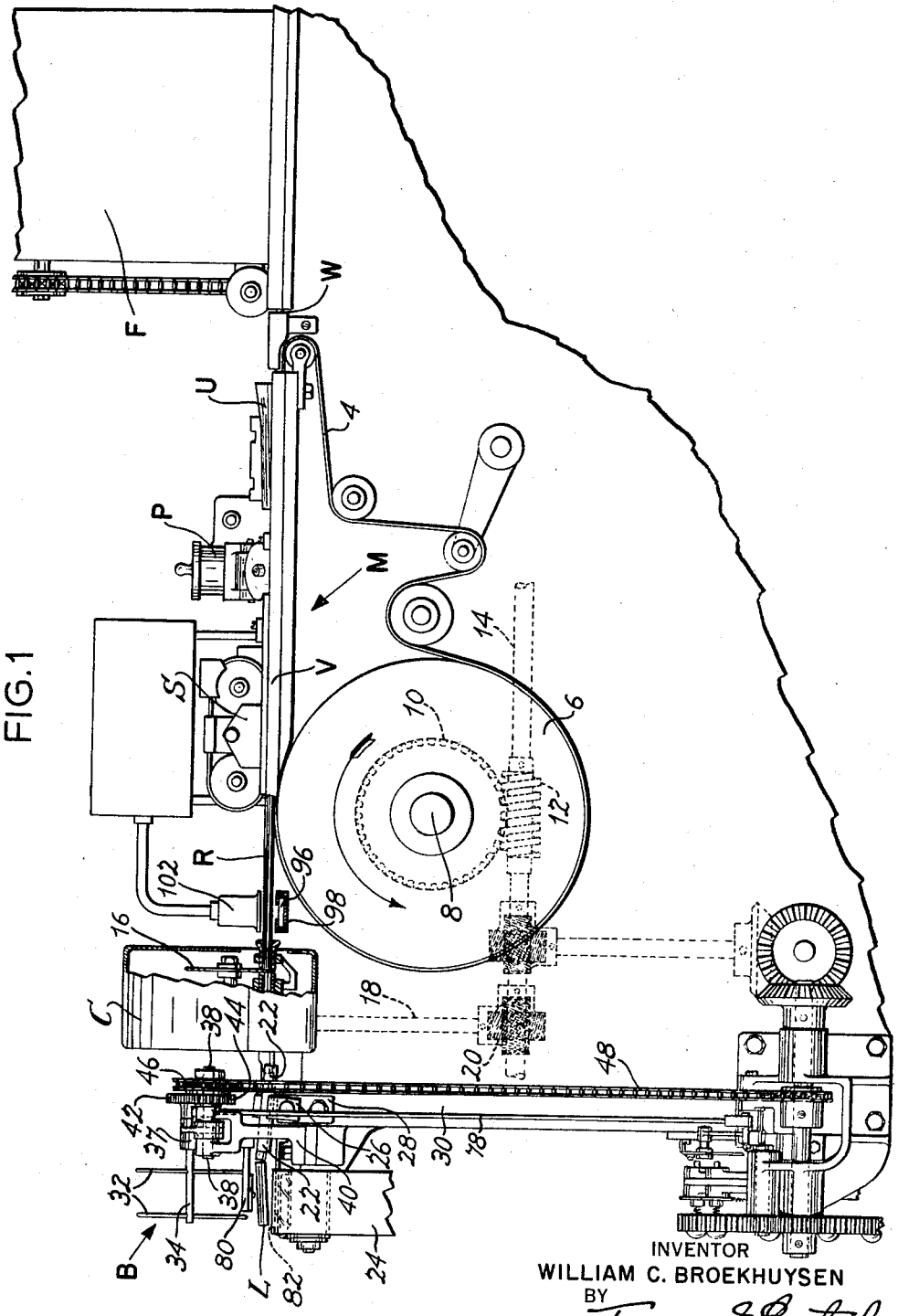
Figure 1 is a front elevation, with part broken away of a continuous rod cigarette machine equipped with a radiation type detector for operating the correcting and rejecting controls of a cigarette making machine.

For purposes of illustrating our invention, I have shown in Figure 1 a conventional continuous rod cigarette making machine which consists of a tobacco feed designated generally by the symbol F and a cigarette maker designated generally by the symbol M. The principal components of cigarette maker M consist of a rod folder tongue U, rod former V, a cigarette rod paster P, a rod sealer S, a cutoff device C, and a cigarette catcher or collector B. The manner in which these components of a cigarette making machine function may be briefly described as follows:

The tobacco feed F showers tobacco continuously onto a travelling tape and paper web W. The paper web W is guided through the rod folder tongue U, through the rod paster P, which applies a strip of paste to the lap edge of the cigarette rod, through the rod former V and through the rod sealer S, by a continuously moving folding belt 4 driven by the drum 6. Drum 6 is secured to a shaft 8 having a gear 10 driven by a worm 12 secured to the main drive shaft 14 of the cigarette making machine.

When the cigarette rod R emerges from the rod former V, it passes through the cigarette cutoff C such as shown in U.S. Patent 1,075,274 wherein a knife 16 driven, in proper time relation with the movement of the cigarette rod, from the shaft 18 through a pair of spiral gears 20 from the main shaft 14, and cuts off individual cigarettes L of a predetermined length from the cigarette rod.

These cigarettes are delivered and pushed through a guide channel 22 onto a continuously driven collector belt 24. The guide channel 22 is held by a bracket 26 adjustably attached to a lug 28 fastened to the bed 30 of the cigarette machine. Belt 24 is driven from the main drive of the machine in a conventional manner (not shown).

Between the sealer S and the cutoff C the rod passes between a source of radiation 96 and a detector 102 which will be more fully described later on. While we have chosen to illustrate the invention by measuring the density of tobacco in the rod, it will be understood the same method may be applied anywhere along the stream of tobacco where the flow is sufficiently confined and the density sufficiently high to cause measurable absorption.

The ejecting mechanism shown in Figures 1, 2, and 3 is actuated by means of a relay 74 which corresponds with the relay 225 disclosed in U.S. Patent 2,357,801. When relay 74 is energized, it effects the setting in operation of a timing disc and indexing mechanism mounted in a housing 76, said mechanism performs the same function and is of the same construction as the one disclosed in the above mentioned patent and is driven in synchronism with all other units of the cigarette making machine by means of a shaft 72.

The indexing mechanism, through a sprocket chain 48 drives a sprocket 46 which is loosely mounted on a shaft 138 and to which is attached a gear 44 driving a gear 42. The gear 42 is mounted on a shaft 34 supported by an arm 37 which is pivotally attached to the shaft 38 supported in a bearing bracket 40. The latter is secured to the main frame 30 of the cigarette making machine. The free end of shaft 34 carries a pair of ejector rods 32, which, when shaft 34 is driven, rotates in the direction of the arrows shown in Figure 3. Arm 37, by means of a connecting rod 78, is connected to and oscillated by a suitable cam lever which forms part of the indexing mechanism fully described in U.S. Patent 2,357,801 referred to heretofore. The individual cigarettes cut off from the continuous cigarette rod emerge from the cutoff C and are delivered and pushed through a guide channel 22 held by a bracket 26 adjustably attached to a lug 28 fastened to the frame 30 of the cigarette making machine.

The machine is so timed and synchronized that the rotating ejector rods 32 are lowered by connecting rod 78 and arm 37 into position to sweep off the cigarettes delivered at that moment from the guide channel 22 onto the collector belt 24. The cigarette to be ejected is caught by the ejector rods 32 in mid-air and thrown into an ejector chute formed by a pair of guide plates 80 and 82 which are adjustably attached to the bearing bracket 40.

My radiation detector is also adapted for operating a feed control in the manner also shown in Figure 2 to increase or decrease the amount of tobacco fed in accordance with changes in the density or mass of the cigarette rod being formed. In such a case, the output of the detector would be connected to an integrating circuit which in turn is connected to an indicating meter such as shown in Figure 2 which in turn would be used to actuate a control device in a manner broadly similar to that shown in U.S. Patent 1,864,728 issued to Mr. W. J. Hawkins, et al. on June 28, 1932. This may be accomplished by mounting the contact arm 84 of the Hawkins patent on the shaft 86 of the indicating meter. The movement of the shaft 86 of the indicating meter controls the movement of the contact arm 84.

The movement of contact arm 84 causes the Reeves drive control 88, through segments 90, to rotate in one direction or the other causing the Reeves drive 92 to increase or decrease the speed of the feeding apparatus 94 of the cigarette making machine. If desired, reference may be made to the Hawkins patent referred to herein for a more detailed description of the manner in which said feed control operates.

Referring to Figures 1 and 2 of the drawings, I have illustrated the manner in which the mass or density of the cigarette rod being manufactured may be measured by means of penetrating radiation while the machine is being operated continuously. A suitable source 96 of penetrative radiation such as strontium 90 is enclosed within a protective shield 98 containing an opening 100 covered by a suitable cover 101 such as a thin sheet of beryllium, brass or mica through which the penetrative radiation is directed to the cigarette rod.

While it is possible to successfully employ various types of radiation, from infra red, through visible rays to X-rays and gamma rays, I have preferred to use rays of more penetrative power than light rays, but which are more readily absorbed than X-rays, such as beta rays, which can be conveniently obtained from a source like strontium 90. I prefer to use beta rays because the absorption of beta rays depends only on the density or weight per unit area of the material and is not dependent on the transparency or opacity of the material as would be the case with light rays, nor on the chemical composition as for X-rays, nor is it affected by variations in other properties of the material such as its dielectric constant. The absorption of beta rays by the tobacco is affected by moisture to the same extent only as the moisture increases the weight.

Moreover, since beta rays have a more limited penetrating power than X-rays, it is very simple to prevent radiation in any but the desired location. The use of a radio-active isotope like strontium 90 eliminates the need for high voltage apparatus which is required for the generating of X-rays.

On the opposite side of the cigarette rod is placed a radiation detector 102 which is directly in the path of the rays escaping through the opening 100. Any suitable type of detector such as an ionization chamber may be employed for detecting the amount of radiation passing through the cigarette rod. If it is used for the purpose of measuring the density of individual cigarette lengths, a fast responding ionization chamber containing, for example, a mixture of argon and carbon dioxide should be used in order to get high speed response. The output of the radiation detector is passed through one or more amplifying circuits such as the pre-amplifier and amplifier shown in Figure 2 and on to an integrating or averaging circuit. The output of the averaging circuit is used to operate the contact arm 84 of an indicating meter 90 for the purpose of adjusting the rate of feed of a cigarette making machine. A fast-acting relay 74 is also connected directly to the amplifier. This relay is used for the purpose of ejecting defective cigarettes. Either may be used separately or they may be used together for the purposes of ejection and feed control.

The amount of radiation detected by the detector 102 will vary with the amount of radiation absorbed by the cigarette rod passing between the source of penetrative radiation 96 and the radiation detector 102. The greater the mass of the cigarette rod R, the greater will be the amount of radiation absorbed by the rod, which will of course, vary the amount of radiation detected by the detector 102.

Should there be plugs or exceptionally dense portions in the cigarette rod, a marked degree of absorption by the rod will be indicated and this will result in the operation of the relay 74 which in turn will cause the memory mechanism previously described herein to be set into operation so as to cause the defective cigarette to be rejected.

When the averaging circuit is connected to the feed control shown in Figure 3, it will cause more tobacco or less tobacco to be fed, depending upon the amount of radiation absorbed by the passing cigarette rod.

The invention above described may be varied in construction within the scope of the claims, for the particular device selected to illustrate the invention is but one of many possible embodiments of the same. The invention, therefore, is not to be restricted to the precise details of the structure shown and described.

What is claimed is:

1. In apparatus for automatic control of the feeding rate of tobacco in response to variation in mass of a length of moving tobacco filler, including feed mechanism for delivering tobacco from a source to form the filler, variable control means for altering the rate of feed by said mechanism, and a detector responsive to variation in mass of the filler and operable to regulate said variable control means, the combination with a detector comprising a beta-ray measuring device positioned adjacent the moving filler to detect variation in mass thereof, of an amplifying circuit on which the signal output of said measuring device is impressed, said amplifying circuit including an integrating device for averaging over a predetermined period the detector signal output, relay means energized from said circuit and having two contacts selectively operable in response to detection of variation of the filler from the desired mass by a predetermined tolerance above and below the desired value, and means controlled on operation of either of said contacts to raise and lower respectively the rate of feed of tobacco, the time-lag between rate of feed alteration and subsequent response from the detector being such that when the mass of the filler varies from the desired value beyond the predetermined tolerance, alteration of the rate of tobacco feed starts and continues until the mass of tobacco passing the detector differs from the desired mass by a value less than the predetermined tolerance, whereupon the selected contact is rendered inoperable.

2. In apparatus for automatic control of the feeding rate of tobacco in response to variation in mass of a length of moving tobacco filler, including feed mechanism for delivering tobacco from a source to form the filler, variable control means for altering the rate of feed by said mechanism, and a detector responsive to variation in mass of the filler and operable to regulate said variable control means, the combination with a detector comprising a beta-ray measuring device positioned adjacent the moving filler to detect variation in mass thereof, of an amplifying circuit on which the signal output of said measuring device is impressed, said amplifying circuit including an integrating device for averaging over a predetermined period the detector signal output, and means energized by said circuit and selectively operable in response to detection of variation of the filler from the desired mass by a predetermined tolerance above and below the desired value to actuate said variable control means to raise and lower respectively the rate of feed of tobacco, the time-lag between rate of feed alteration and subsequent response from the detector being such that when the mass of the filler varies from the desired value beyond the predetermined tolerance, alteration of the rate of tobacco feed starts and continues until the mass of tobacco passing the detector differs from the desired mass by a value less than the predetermined tolerance, whereupon said variable control actuating means is rendered inoperable.

3. In a cigarette-making machine having a rod-former for forming a cigarette rod, means for advancing the rod, and means for successively cutting cigarettes of predetermined length from the rod, the combination of apparatus for rejecting defective cigarettes having density characteristics which deviate from a predetermined norm, comprising a source of beta-ray radiation of known cross-section and intensity positioned adjacent one side of the path of travel of the cigarette rod and adapted to project a beam of radiation through said rod, a fast-acting radiation detector positioned opposite said source of radiation, said detector having a high rate of response on the order of that exhibited by an ionization chamber containing a mixture of argon and carbon dioxide and being operative to detect substantially instantaneous variations in the magnitude of said beam caused by variations in the density of successive increments of the cigarette rod subjected to said beam, said detector producing an output signal representative of said density changes in such successive increments of the cigarette rod, a cigarette ejector disposed adjacent the path of travel of cigarettes cut from the rod and operative to eject individual cigarettes, and means responsive to the output signal of said detector for actuating said ejector upon detection of an undesirable density characteristic in one of said increments, said last-mentioned means including synchronizing means operative to cause actuation of said ejector to occur at the time when the cigarette containing such defective increment has reached said ejector.

References Cited in the file of this patent
UNITED STATES PATENTS

| | | |
|---|---|---|
| 1,864,728 | Hawkins et al. | June 28, 1932 |
| 2,264,725 | Shoupp et al. | Dec. 2, 1941 |
| 2,349,429 | Herzog et al. | May 23, 1944 |
| 2,357,860 | Whitaker | Sept. 12, 1944 |
| 2,363,577 | Dexter | Nov. 28, 1944 |
| 2,488,269 | Clapp | Nov. 15, 1949 |
| 2,493,935 | Wiegand et al. | Jan. 10, 1950 |
| 2,640,788 | Rockett | June 2, 1953 |
| 2,656,476 | Firminhac | Oct. 20, 1953 |
| 2,679,317 | Roop | May 25, 1954 |
| 2,704,079 | Molins et al. | Mar. 15, 1955 |
| 2,737,186 | Molins et al. | Mar. 6, 1956 |
| 2,742,150 | Rendel | Apr. 17, 1956 |

OTHER REFERENCES

"Beta Ray Thickness Gage for Sheet Steel" by Otto J. M. Smith Electronics, Oct. 1947 pp. 106–112.

"Drying and Processing of Materials by Means of Conditioned Air," published 1929 by Carrier Engineering Corp., Newark, N.J. page 181.

"Electronics," pages 106–112, Oct. 1947.